United States Patent [19]
Keller, Jr.

[11] 3,867,285
[45] Feb. 18, 1975

[54] OIL-WATER SEPARATION PROCESS

[76] Inventor: Howard F. Keller, Jr., 17532 Amaganset Ln., Tustin, Calif. 92680

[22] Filed: Oct. 15, 1973

[21] Appl. No.: 406,253

Related U.S. Application Data

[63] Continuation-in-part of Ser. No. 228,307, Feb. 22, 1972, abandoned.

[52] U.S. Cl...................... 210/32, 210/40, 210/73, 210/80
[51] Int. Cl............................................. B01d 15/06
[58] Field of Search............ 210/80, 275, 502, 503, 210/23, 40, 30, 44, 73, 32, 36

[56] References Cited
UNITED STATES PATENTS

| | | | |
|---|---|---|---|
| 3,574,329 | 4/1971 | Beavon | 210/80 |
| 3,718,457 | 2/1973 | Entwisle et al. | 210/503 |

*Primary Examiner*—Samih N. Zaharna
*Assistant Examiner*—Benoît Castel
*Attorney, Agent, or Firm*—Donald Diamond

[57] ABSTRACT

A fluid system containing oil having an API Gravity value from about 11 to about 70, water and particulate solids is filtered through a finely divided oil and water insoluble filter media to retain particulate solids and oil within the filter media and pass an effluent of either clarified water or a mixture of solids-free oil and water which separates into defined layers of solids-free oil and clarified water, with the mixture being attained when the oil content of the fluid system is in excess of about 1 percent by weight.

The filter media has minimum and maximum particle mesh sizes which are a function of flow rate and solids retention, a median particle mesh size, by weight, which is a function of the API Gravity of the oil in the feed fluid, and a particle size distribution pattern which uniformly and progressively increases, by weight, from the minimum particle mesh size to the median particle mesh size and from the maximum particle mesh size to the median particle mesh size.

In the event that the fluid system contains acid insolubilizing, water soluble, organic material, a non-toxic acid is added to the fluid system prior to the filtration step to convert the organic material to a water insoluble, adsorbable oil.

Oil-water systems which contain no significant quantity of particulate solids can be treated by the foregoing method to produce clarified water and oil. The steps of the method are the same except that no significant quantity of particulate solids is retained by the filter media and, thus, no significant quantity of particulate solids is removed from the filter media during the backwashing step.

12 Claims, No Drawings

OIL-WATER SEPARATION PROCESS

CROSS-REFERENCE TO RELATED APPLICATION

This application is a continuation-in-part of U.S. Patent application No. 228,307 filed Feb. 22, 1972, entitled Oil-Water Separation Process, and now abandoned.

BACKGROUND OF THE INVENTION

This invention relates to a filtration method for treating fluid systems containing oil, water and particulate solids to produce clarified water, solids-free oil and oil-free solids; and, more particularly, it relates to the use of an improved filter media which permits more rapid and efficient filtration treatment of such fluid systems.

In petroleum processing, fluid systems containing water, oil and particulate solids are encountered from which the oil and solids must be substantially completely removed so that the water can be reused or discarded without causing pollution.

Heretofore, it has been common practice in the petroleum industry to resolve such fluid systems by initially stratifying the system through gravity separation which permits the oil to float to the surface. In this step, the fluid system is retained for at least several hours in a large holding tank which is equipped with machinery to skim and then remove the oil from the surface for processing. After the floating oil is removed, water and solids remain in the tank. Typically, the solids are oil-wet, finely divided earth residues and/or precipitates such as calcium carbonate, calcium sulfate, or iron sulfide which resist agglomeration, and, because they have a specific gravity close to that of water, do not tend to rise with the oil during the oil floatation and removal step. The oily solids are separated from the water by flocculation and sedimentation or by air floatation. Thereafter, the solids, in the form of an oily floc, are mechanically separated from the water phase, thickened by vacuum filtration, and incinerated or buried as landfill.

PRIOR ART

U.S. Pat. No. 3,574,329 (Beavon, 1971), after noting that the aforesaid separation method is costly and inefficient discloses a filtration method of treating an oil-water system containing particulate solids to produce clarified water, solids-free oil and oil-free solids which includes the following steps:

a. filtering an oil-water system containing particulate solids through a granular filter media, such as sand, having a particle size from about 0.1 to 5 mm in average diameter; the filtration rate is from about 2 to about 10 gallons per minute per square foot of filter media surface area; solids are retained by the filter media and an effluent passed through consisting of clarified water or a mixture of water and oil which will readily separate into defined layers of clarified water and oil; and b. periodically regenerating the filter media by stripping oil therefrom with either steam or an organic solvent and thereafter backwashing with water at a rate from about 3 to about 15 gallons per minute per square foot of filter bed surface area to remove oil-free entrained solids from the filter bed.

Although the filtration method disclosed in U.S. Pat. No. 3,574,329 for treating fluid systems containing oil, water and particulate solids to produce clarified water, solids-free oil and oil-free solids constitutes an improvement in the art, it would, of course, be significantly advantageous to provide an improved filtration method for treating the aforesaid fluid systems which would permit more rapid and efficient filtration and resolution of such systems.

DEFINITIONS

The term "parts per million" means parts by weight per one million parts by weight. The term "clarified water" means water containing less than 15 parts per million of oil.

The term "oil" means petroleum type oil.

The term "API Gravity value" means the American Petroleum Institute standard for measuring density of fluids having a specific gravity less than one.

The terms "mesh" and "mesh size" mean U.S. Standard Sieve Series (1940) corresponding to National Bureau of Standards LC 584.

The term "median particle mesh size" means a specified mesh size, for a given quantity of filter media, at which one-half of the media, by weight, has a particle size larger than the specified mesh size and the other half of the media, by weight, has a particle size smaller than the specified mesh size.

SUMMARY OF THE INVENTION

In accordance with this invention, a fluid system containing oil having an API Gravity value from about 11 to about 70, water and particulate solids is filtered through a finely divided oil and water insoluble filter media to retain particulate solids and oil within the flter media and pass an effluent of either clarified water or a mixture of solids-free oil and water which separates into defined layers of solids-free oil and clarified water, with the mixture being attained when the oil content of the fluid system is in excess of about 1% by weight.

The filter media has the following characteristics:

i. a minimum particle mesh size within the range from about 3 to about 30 and a maximum particle mesh size within the range from about 30 to about 100 with the range between the minimum and maximum particle mesh sizes being at least about 20 mesh;

ii. a median particle mesh size, by weight, which is a function of the API Gravity value of the oil; the median particle mesh size falls within the range defined by upper and lower median particle mesh size linear values which vary directly with the linear values of the API Gravity; the upper median particle mesh size linear values vary from about 18 to about 62 and the lower median particle mesh size linear values vary from about 10 to about 54 as the API Gravity values vary linearly from about 11 to about 70; and iii. a particle size distribution pattern extending from the minimum particle mesh size to the maximum particle mesh characterized in that the weight of the filter media substantially uniformly and progressively increases:

a. from about 0 to 50 weight percent as the filter media particle mesh size varies from the minimum particle mesh size to the median particle mesh size, and b. from about 0 to 50 weight percent as the filter media particle mesh size varies from the maximum particle mesh size to the median particle mesh size.

When the fluid system contains acid insolubilizing, water soluble, organic material, the fluid system, prior to filtration, is acidified with a non-toxic acid to a pH below about 4.8 to convert the organic material to a water insoluble, adsorbable oil.

The filter media is periodically regenerated by stripping oil therefrom and then backwashing the media to remove entrained solids. The products produced by the method of the invention include clarified water, solids-free oil nd oil-free solids.

The filter media of this invention constitutes a significant advance over the prior art filter media for resolving the aforesaid fluid systems in that not only higher flow rates attainable but the efficiency of the filter media is substantially improved with respect to cycle time and oil retention as will be apparent from the detailed description and specific examples hereinafter set forth.

DESCRIPTION

The fluid system which can be treated in accordance with the method of this invention contains water, particulate solids, and oil having an API Gravity value from about 11 to about 70, and is obtained from various sources such as petroleum refinery streams, oil purification streams, as well as rolling mill streams from steel mills and like processes containing lubricating or cutting oils. The oil content of the fluid system may vary from about 15 parts per million to an amount in excess of 50 weight percent of the fluid system. The particulate solids may be earth residues, precipitates, salts, processing byproducts, bacterial, algial and fungal solids and other entrainments and are usually oil-wet.

In the event that the fluid system contains acid insolubilizing, organic materials such as napthenics, phenolics and/or sulfonic acid in water soluble form, a non-toxic acidifying agent as, for example, carbon dioxide, hydrochloric acid, sulfuric acid or phosphoric acid is added thereto in an amount to adjust the pH thereof below about 4.8 to convert the water soluble organic material to a water insoluble, adsorable oil.

The fluid system is passed through a filter media contained within an appropriate vessel at a rate from about 10 to about 35 gallons per minute per square foot of filter media surface area and, preferably, at a rate from about 15 to 30 gallons per minute per square foot of filter media surface area. It has been found that this rate of processing can be achieved by effecting filtration through a finely divided, water and oil insoluble filter media having a median particle mesh size, by weight, as a function of the API Gravity value of the oil in the feed fluid.

In general, the filter media has a minimum particle mesh size within the range from about 3 to about 30 and maximum particle mesh size within the range from about 30 to about 100 with the range between the minimum and maximum particle mesh sizes being at least about 20 mesh. The preferred range between minimum and maximum particle mesh sizes is at least about 30 mesh. The selection of minimum and maximum particle mesh sizes is based on flow rate and solids retention as illustrated by Examples VI and VII.

The median particle mesh size of the filter media, by weight, falls within the range defined by upper and lower median particle mesh size linear values which vary directly with the linear values of the API Gravity. More specifically, the upper linear value varies from about 18 to about 62 and the lower linear value varies from about 10 to about 54 as the API Gravity value varies linearly from about 11 to about 70. In a preferred embodiment, the median particle mesh size of the filter media, by weight, varies linearly from about 14 to about 58 as the API Gravity value varies linearly from about 11 to about 70. The median particle mesh size range for a specific API Gravity value can be readily determined by preparation of a two-dimensional graph. In the two-dimensional graph, API Gravity values are plotted linearly along the x-axis and particle mesh size values are plotted linearly along the y-axis. A first linear line is extended from x,y coordinate 11,18 to x,y coordinate 70,62. The first linear line represents the upper median particle mesh size values. A second linear line is extended from x,y coordinate 11,10 to x,y coordinate 70,54. The second linear line represents the lower median particle mesh size values. By extending a vertical line upwardly from a specific API Gravity value through the first and second linear lines, the median particle mesh range for the specific API Gravity can be determined by reading, on the y-axis, the points of intersect of the vertical line with the first and second linear lines.

The filter media has a particle size distribution pattern extending from the minimum to the maximum particle mesh size such that the weight of the media substantially uniformly and progressively increases (a) from about 0 to 50 weight percent as the particle mesh size varies from the minimum to the median particle mesh size and (b) from about 0 to 50 weight percent as the particle mesh size varies from the maximum to the median particle mesh size.

The particle size distribution pattern between the minimum and maximum particle mesh sizes, by weight percent, is determined by reference to a two-dimensional triangular distribution curve. The distribution curve is prepared by plotting mesh size in equal units from 3 to 100 along the x-axis and by plotting equal weight percent units of the total media along the y-axis from a minimum value of 0 weight percent to a maximum value of 50 weight percent. The minimum, median and maximum particle mesh sizes are marked on the x-axis. A vertical line is extended from the median mesh size point to the 50 weight percent ordinate. The point of intersect represents the peak of the triangular distribution curve of particle mesh size by weight percent. A first linear line is extended from the peak to the minimum particle mesh size value on the x-axis and a second linear line is extended from the peak to the maximum particle mesh size value on the x-axis. The area under the curve represents the total weight of the filter media. The mesh size range on the x-axis, from the minimum to the maximum particle mesh size, is divided into segments with the segment ranges on each side of the median point being uniform in mesh spread. A vertical line is extended from the upper mesh value of each segment to the adjacent slope line. Thus, the triangle is divided into trapezoidal segments having areas corresponding to the weight percent of the mesh size segments.

The filter media should be insoluble with respect to water and oil as well as the solvent system used to remove oil from the filter bed during the filter media regeneration step. Materials which can be used as the filter media include, for example, garnet, aluminum oxide, ground slag, volcanic tuff, oil shale, volcanic slag, ground brick, magnesium oxide, glass, sand, weighted organic polymers and mixtures thereof. The preferred filter media materials are garnet, aluminum oxide, ground slag and volcanic tuff. Optimum processing results are attained when the filter bed is prepared from garnet and/or aluminum oxide. A weighted organic polymer which can be used as the filter media is polypropylene weighted with barium sulfate.

The filter media may advantageously contain from about 2 to about 8 cubic feet of filter material for each square foot of filter media surface area. A multiple layer filter media with each layer being of a different material can also be used in practicing the method of this invention providing that the median particle mesh size for the composite bed is that which is required by the API Gravity value of the oil in the fluid system being treated.

In the filtration step, solids and oil from the fluid system being filtered are retained within the filter media and an effluent is passed through the filter containing clarified water or a mixture of oil and water. The composition of the effluent depends upon the concentration of oil in the fluid system. When the oil content of the fluid system exceeds about 1%, by weight, the effluent is a mixture of oil and water. In this instance, the filter media functions as filter-coalescer to form a discrete mixture of large oil droplets and water which can be readily separated into defined layers of clarified water and oil by passing the mixture through an oil-water separator. When the oil content of the fluid system is less than about 1%, by weight, all of the oil is retained by the filter media and the effluent is clarified water.

The filter media, at or prior to the time of saturation with particulate solids and/or oil, is regenerated by stripping oil therefrom and then backwashing to remove entrained oil-free solids. Oil stripping is effected by discontinuing input of the fluid system, allowing free fluids to drain and then stripping oil from the filter media without disrupting entrained solids by passing a stripping composition through the filter media in the same direction of flow as that of the fluid system containing oil, water and particulate solids. The stripping composition may be steam or an organic solvent for the oil. When the oil stripping composition is steam, it is or may be advantageous to combine a refined low viscosity oil with the steam during the initial phase of the oil stripping step. Preferably, a low viscosity solvent such as kerosene, diesel oil, cutters stock, cycle oil, coker distillate or a mixture thereof is added to the steam for the initial one-third of the steam cycle time.

When the filter bed has been stripped of oil, the entrained oil-free solids are removed by backwashing with water in a direction countercurrent to the flow of the fluid system at a rate from about 10 to about 35 gallons per minute per square foot of filter media surface area and, preferably, at a rate from about 10 to about 20 gallons per minutes per square foot of filter media surface area. Since the backwashing step is carried out at a high flow rate, it is advantageous to use high density materials as the filter media such as garnet or aluminum oxide.

The mixture of water and particulate solids obtained from backwashing is removed to a settling pond or cyclone separator where oil-free solids are recovered. After backwashing, the filter bed is ready for reuse.

Since the sequence of filtration and filter media regeneration can be repeated indefinitely, and since it may be desired to operate the filtration system continuously, it is preferred to operate two or more filters in parallel, one or more filters being used to filter the fluid system containing oil, water and particulate solids while one or more filters are being regenerated.

The clarified water obtained by practicing the method of this invention is returned to the system for reuse or is prepared for disposal to waste.

It is also within the ambit of this invention to treat oil-water systems by the steps of the method described herein to produce clarified water and oil. The oil-water systems are either emulsions or suspensions but contain no significant quantity of particulate solids. Examples of such systems include soluble oils from machine tool and equipment operations, and coal tar oil-water systems from coke production. The method for treating the oil-water system is the same as that for treating the oil-water-particulate solids system except that no significant quantity of particulate solids is entrained in the filter media during the filtration step and, thus, the backwash effluent contains no significant quantity of particulate solids.

EXAMPLE I

This example compares the results obtained by filtering a fluid system containing oil, water and particulate solids through filter media having a defined particle size distribution pattern with the results obtained by filtering such system through filter media containing particles of the same size.

Filter media were prepared containing: (a) 20 mesh sand; (b) garnet having a defined particle size distribution pattern; and (c) aluminum oxide having a defined particle size distribution pattern. Oil field production water having an API Gravity value of 22 and containing approximately 680 parts per million of oil and 110 parts per million of solids was passed through the filter media at specified flow rates and measurements were taken with respect to oil and solids contents of the effluent in parts per million, time to oil breakthrough, time to 35 psi pressure, and pounds of oil per cubic foot of media at oil breakthrough.

The results obtained when oil field production water was passed through 20 mesh sand at the rate of 20 gallons per minute per square foot of filter media surface area are set forth in Table A.

Table A

| Filter Media: 20 Mesh Sand | |
|---|---|
| Flow Rate, gpm | 20 |
| Oil content, ppm | 9.0 |
| Solids content, ppm | 11.0 |
| Time to breakthrough, min. | 27'' |
| Time to 35 psi, min. | 12'' |
| Lbs. oil/cu. ft. | 0.18 |

A series of filter media were prepared from garnet having mesh size range, median mesh size, and mesh size distribution as set forth in Table B.

Table B

| Sieve size | Filter Media Garnet | | | | | |
|---|---|---|---|---|---|---|
| | B1 | B2 | B3 | B4 | B5 | B6 |
| Mesh size range | 10-30 | 10-30 | 10-30 | 20-60 | 20-60 | 20-60 |
| Median mesh size, by wt. | 18 | 20 | 24 | 28 | 38 | 48 |
| | (Particle Size Distribution, % by wt., Retained) | | | | | |
| 10 | 4 | 3 | 2 | | | |
| 12 | 7 | 6 | 5 | | | |
| 14 | 12 | 10 | 8 | | | |
| 16 | 19 | 15 | 10 | | | |
| 18 | 28 | 16 | 11 | | | |
| 20 | 10 | 22 | 15 | 1 | 1 | 2 |
| 24 | 8 | 20 | 23 | 13 | | |
| 28 | 7 | 6 | 24 | 25 | | |
| 30 | 5 | 2 | 2 | 17 | 8 | 8 |
| 34 | | | | | 20 | |
| 38 | | | | | 23 | |
| 40 | | | | 26 | 18 | 10 |
| 44 | | | | | | |
| 48 | | | | | | 19 |
| 50 | | | | 12 | 18 | 24 |
| 54 | | | | | | 8 |
| 58 | | | | | | |
| 60 | | | | 6 | 7 | 8 |

The results obtained when oil field production water was passed through each of the media identified in Table B at a rate of 20 gallons per minute per square foot of filter media surface area are set forth in Table BB.

Table BB

| Filter media | B1 | B2 | B3 | B4 | B5 | B6 |
|---|---|---|---|---|---|---|
| Flow rate, gpm/sq.ft. | 20 | 20 | 20 | 20 | 20 | 20 |
| Oil Content, ppm | 15 | 1.0 | 0.5 | 0.6 | 0.8 | 0.8 |
| Solids content, ppm | 12 | 4.1 | 3.2 | 1.8 | 0.8 | 0.6 |
| Time to breakthrough, min. | 36" | 1' 42" | 3' 5" | 4' 8" | 4' 45" | |
| Time to 35 psi, min. | — | — | 4' 10" | 3' 15" | 3' 10" | |
| Lbs. oil/cu. ft. | 2.75 | 4.0 | 6.4 | 7.3 | 7.68 | |

A filter bed was prepared from aluminum oxide having a particle mesh size range from 20 to 50 and a median particle mesh size of 26. The results obtained when oil field production water was passed through the aluminum oxide filter bed at a rate of 20 gallons per minute per square foot of filter media surface area are set forth in Table C.

Table C

| Filter Media: Aluminum Oxide | |
|---|---|
| Flow rate, gpm/sq.ft. | 20 |
| Oil content, ppm. | 0.4 |
| Solids content, ppm. | 0.6 |
| Time to breakthrough, min. | 6'17" |
| Time to 35 psi, min. | 3'06" |
| Lbs. oil/cu. ft. | 6.3 |

Thus, by comparing the results in Table BB and Table C with results in Table A, it will be noted that when the filter media has a defined particle size distribution pattern, not only are higher flow rates attainable but the efficiency of the filter is substantially improved as evidenced by increasing time to oil breakthrough, increased time to 35 psi pressure, increased oil retention and improved water quality.

EXAMPLE II

One-tenth cubic foot of garnet weighing about 14 pounds and having a particle mesh size range from 8 to 30 and a median particle mesh size of 22 was added to a 3-inch filtration tube to provide a filter bed having a depth of 2 feet. A refinery slop oil emulsion containing 51.7% oil, 3.18% insoluble particulate solids and having an API Gravity of 24 was passed through the filter media at a rate equivalent to 20 gallons per minute per square foot of filter media surface area for 47 minutes. At the end of the run, 99.984% of the solids in the fluid system were retained by the filter media. The effluent from the filter media contained a mixture of oil and water. This mixture was removed to an oil-water separator where it separated into defined layers of clarified water and oil. The oil contained 1.3% water and was pipeline quality. The water contained 8.2 parts per million of oil and was non-polluting. The percentages in this example are on a weight basis.

The filter media was regenerated by steam treatment and backwashing. Steam, at 125 pounds pressure, was passed through the filter media, in the same direction of flow as that of the refinery slop oil emulsion, for 20 minutes at a 10 pound pressure drop across the filter bed. The resulting steam-oil mixture, on condensation, readily separated into solids-free clean oil and oil-free water. After the steam treatment, the filter media was backwashed with water at a rate equivalent to 20 gallons per minute per square foot of filter media surface area for 3 minutes. The oil-free solids in the resulting solids-water mixture flocculated and settled readily.

EXAMPLE III

Refinery waste water containing 36 parts per million of particulate solids and 74 parts per million of oil having an API Gravity of 36 was passed through a filter media corresponding to that described in Example II except that the particle mesh size range was from 14 to 60 and the median particle mesh size was 38. The run time was 9 hours. At the end of the run, substantially all of the particulate solids were retained by the filter media. The effluent from the filter media contained 1.12 parts per million of oil and, therefore, was clarified water. The filter media was regenerated by steam treatment and backwashing in accordance with procedure set forth in Example II.

EXAMPLE IV

To refinery waste water containing 58 parts per million of particulate solids, 120 parts per million of oil having an API Gravity of 30 and 80 parts per million of water soluble organic material, namely, napthenics, phenolics and sulfonic acid, there was added carbon dioxide in an amount to adjust the pH thereof to 4.8 to convert the water soluble organic material to a water insoluble, adsorbable oil. The acidified fluid system was passed through a ground volcanic tuff filter media at a rate equivalent to 20 gallons per minute per square foot of filter media surface area. The filter media had a particle mesh size range from 14 to 60 and a median particle mesh size of 30. The resulting effluent contained 1.8 parts per million of oil. 4.9 parts per million of water soluble organic material and 0.5 parts per million of particulate solids. The filter media was regenerated by steam treatment and backwashing in accordance with the procedure set forth in Example II.

EXAMPLE V

This example illustrates the blending of media material of different sieve analysis to obtain a composite filter media having a particle mesh size range from 6 to in excess of 100 and a median particle mesh size of 34.

Four samples of garnet, D1, D2, D3 and D4, were obtained having the sieve analysis set forth in Table D Table D

| Mesh Size | Filter Media: Garnet Wt. % | | | | Wt. % Composite |
|---|---|---|---|---|---|
| | D1 | D2 | D3 | D4 | |
| 100 (plus) | 12 | | | | 0.4 |
| 100 | 15 | | | 3.0 | 3.0 |
| 50 | 50 | 10 | 2 | | 15.4 |
| 40 | 20 | 35 | 10 | | 23.5 |
| 30 | 11 | 49 | 12 | 3 | 29.4 |
| 24 | 2 | 6 | 52 | | 13.8 |
| 20 | | | 22 | 15 | 5.9 |
| 16 | | | 2 | 34 | 3.8 |
| 14 | | | | 35 | 3.5 |
| 8 | | | | 10 | 1.0 |
| 6 | | | | 3 | 0.3 |
| Parts by wt. | 2 | 5 | 2 | 1 | |

2 parts of D1, 5 parts of D2, 2 parts of D3 and 1 part D4, by wt., were blended to obtain the composite media set forth in the last column of Table D which had a median particle mesh size of 34.

EXAMPLE VI

This example compares the method of the present invention with the method of the prior art, as described in U.S. Pat. No. 3,574,329, and shows that the method of this invention constitutes a substantial advance in the oily water filtration art with respect to overall efficiency as such pertains to cycle time, oil retention by the filter media and water quality.

Sand was selected as the filter media to be used for the comparatives tests. The source of the feed fluid for the comparative study was a petroleum refinery, oily waste water stream containing 500 parts per million oil and 75 parts per million solids with the oil having an API Gravity of 46. A portion of the oily waste water was diverted from the stream and pumped, at the rate of 35 gallons per minute, through a vertically mounted 60 psi filtration vessel containing 5 cu. ft. (approx. 400 lbs.) of the filter media.

Four sand filters were evaluated in the comparative study. The first three filters, identified herein as Filters F1, F2 and F3, were commercially available filter sands and depict the sand filter as described in the aforesaid patent. The fourth filter, identified herein as Filter F4, corresponds to the filter media of this invention.

Commercial Filter Sands

As to the commercial filter sands, Filter F1 had a particle mesh size range from 25 to 40 and a median mesh size of 31; Filter F2 had a particle mesh size range from 35 to 140 and a median mesh size of 85; and Filter F3 had a particle mesh size range from 5 to 30 and median mesh size of 24.

Filter Media of the Invention

With respect to the filter media of the invention, Filter F4 had a particle mesh size range from 8 to 58 and a median mesh size of 38. The median particle mesh size was determined by reference to a two-dimentional graph wherein median mesh size varies linearly from 14 plus or minus 4 to 58 plus or minus 4 as the API Gravity value varies linearly from 11 to 70.

Since a high flow rate of feed fluid per square foot of filter media would be employed (35 gpm per square foot) the maxium particle mesh size was selected at 58 and the minimum particle mesh size was selected at 8. By eliminating from the filter media particles having a mesh size between 58 and 100, , high flow-rates can be readily achieved.

The particle size distribution pattern from the minimum to the maximum particle mesh sizes was determined by reference to a two-dimensional graph wherein mesh sizes were plotted in equal units from 3 to 100 along the x-axis and equal weight units of the total media, by weight percent, were plotted along the y-axis from a minimum value of 0 weight percent to a maximum value of 50 weight percent.

The minimum, median and maximum particle mesh sizes, 8, 38 and 58, were marked on the x-axis. A vertical line was extended from the median mesh size, 38, to the imaginary line which traverses the 50 wt. % point on the y-axis. This intersect point represents the peak of an approximately triangular distribution curve of particle size of the media by weight percent. A first linear slope line was extended from the peak to the minimum particle mesh size value on the x-axis, 8, and a second linear slope line was extended from the peak to the maximum particle mesh size value on the x-axis, 58.

The area within the triangle represents the total weight of the filter media. The particle mesh size range, 8 to 58, was divided into appropriate mesh size groups and the upper value of each group marked on the x-axis. Vertical lines were extended from each group marking to the adjacent slope line. Thus, the triangle was divided into trapezoidal segments having areas corresponding to the weight percent of the mesh size groups. The predetermined mesh size groups, percent by weight of each group and the weight in pounds of each group based on 400 pounds of media are set forth in Table E.

Table E

| Mesh Size Group | Wt. % | Wt., lbs. |
|---|---|---|
| 8–13 | 2 | 8 |
| 13–18 | 5 | 20 |
| 18–23 | 9 | 36 |
| 23–33 | 15 | 60 |
| 33–38 | 19 | 76 |
| 38–43 | 22 | 88 |
| 43–58 | 28 | 112 |
| | 100 wt. % | 400 lbs. |

Particle Size Characteristics, Filter Medias

The particle size characteristics of the filter medias which were evaluated are set forth in Table F.

Table F

| Particle size Characteristics | Filter Media | | | |
|---|---|---|---|---|
| | F1 | F2 | F3 | F4 |
| Median point | 31 | 85 | 11 | 38 |
| Maximum mesh | 40 | 140 | 30 | 58 |
| Minimum mesh | 25 | 35 | 5 | 8 |
| Mesh range | 15 | 105 | 25 | 50 |

Sieve size/wt. % retained at each size

| F1 | | F2 | | F3 | | F4 | |
|---|---|---|---|---|---|---|---|
| Size | % | Size | % | Size | % | Size | % |
| 30 | 30 | 50 | 3 | 8 | 1.5 | 13 | 2 |
| 35 | 50 | 70 | 28 | 10 | 16.5 | 18 | 5 |
| 40 | 20 | 100 | 42 | 12 | 38.0 | 23 | 9 |
| | | 140 | 25 | 16 | 38.0 | 33 | 15 |
| | | | | 20 | 5.0 | 38 | 19 |
| | | | | 30 | 4.5 | 43 | 22 |
| | | | | | | 58 | 28 |

Comparative Test, Results

The petroleum refinery, oily waste water was passed through separate samples of filter medias F1, F2, F3 and F4 and the results attained with respect to cycle time, oil retention and water quality of the effluent are set forth in Table G.

Table G

| | Filtration Run | | | |
|---|---|---|---|---|
| | G1 | G2 | G3 | G4 |
| Feed fluid | | | | |
| Oil content, ppm | 500 | 500 | 500 | 500 |
| solids content, ppm | 110 | 110 | 110 | 110 |
| flow rate, gpm | 35 | 35 | 35 | 35 |
| cycle time | 16" | 2'30" | 6" | 3'25" |
| total flow, gallons | 560 | 5,250 | 210 | 6,895 |
| total oil, pounds | 2,335 | 21.89 | 0.875 | 28.70 |
| Filter media, | F1 | F2 | F3 | F4 |
| 5 cu. ft. | | | | |
| Effluent | | | | |
| oil content, ppm | 375 | 140 | 3 | 8 |
| solids content, ppm | 35 | 22 | 15 | 5 |
| total oil, pounds | 0.876 | 3.065 | 0.0026 | 0.23 |
| Oil retention | | | | |
| by filter | | | | |
| total oil, pounds | 1.409 | 18.82 | 0.873 | 28.471 |
| oil content, per | 0.282 | 3.76 | 0.179 | 5.695 |
| cu. ft., avg. | | | | |
| Time to end of cycle, | | | | |
| first occurrence | | | | |
| time to oil | 16" | 2'30" | — | 3'15" |
| breakthrough | | | | |
| or | | | | |
| time to 35 psi | — | — | 6" | — |

By comparing the results in filtration run G4, employing the filter media of this invention, with the results in filtration runs G1, G2 and G3, which employed commercially available filter sands, it will be noted that the method of this invention constitutes a significant and substantial improvement over the commercial filter sands of the prior art with respect to overall efficiency as such pertains to cycle time, oil retention and water quality.

Example VII

A filter bed, in accordance with this invention, was designed to adsorb oil and retain solids from a petroleum refinery, oily waste water output of 1,000 gallons per hour. The oily waste water contained 350 ppm oil with an API Gravity of 34 and had a solids content of 110 ppm. Effluent limits were 15 ppm oil and 20 ppm solids.

Sand was selected as the filter media because of availability and low cost. The median particle mesh size, based on the API Gravity value of the oil, was 35. A maximum particle mesh size of 95 was selected in view of the solids retention requirement. A minimun particle mesh size of 25 was selected since high flow rates through the filter media were not required. The mesh size range from 25 to 95 was divided into segments with segment range being uniform on each size of the median point. The weight percent for each segment range was determined by reference to a triangular distribution curve prepared in accordance with the procedure set forth in Example VI. The particle mesh size distribution pattern and the weight percent for each segment are set forth in Table H.

Table H

| Particle mesh size, by segment | Wt. % by segment |
|---|---|
| 25–30 | 12.5 |
| 30–35 | 37.5 |
| 35–45 | 15.0 |
| 45–55 | 12.5 |
| 55–65 | 9.5 |
| 65–75 | 7.5 |
| 75–85 | 4.0 |
| 85–95 | 1.5 |
| | 100.0 wt. % |

The effluent from the filtration of oily waste water through a sand filter bed having the aforesaid particle size distribution pattern contained less than 15 ppm oil and less than 20 ppm solids.

That which is claimed is:

1. A method for treating a fluid system containing oil having an API Gravity value from about 11 to about 70, water and particulate solids to produce clarified water, solids-free oil and oil-free solids which comprises:

A. filtering said fluid system through a finely divided oil and water insoluble filter media containing from about 2 to about 8 cubic feet of filter material for each square foot of filter media surface area, at a flow rate from about 10 to about 35 gallons per minute per square foot of filter media surface area to retain particulate solids and oil within the filter media and pass an effluent selected from the group consisting of:
clarified water and
a mixture of solids-free oil and water which separates into defined layers of solids-free oil and clarified water, said mixture being attained when the oil content of the fluid system is in excess of about 1% by weight, said filter media having:
i. a minimum particle mesh size within the range from about 3 to about 30 and a maximum particle mesh size within the range from about 30 to about 100 with the range between said minimum and maximum particle mesh sizes being at least 20 mesh,
ii. a median particle mesh size, by weight, which is a function of the API Gravity value of the oil, said median particle mesh size falling within the range defined by maximum and minimum linear values which vary directly with the linear value of said API Gravity, said median mesh size maximum linear value varying from about 18 to 62 and said median mesh size minimum linear value varying from about 10 to 54 as said API Gravity value varies from about 11 to 70, and
iii. a particle size distribution pattern extending from the minimum particle mesh size to the maximum particle mesh size characterized in that the weight of the filter media substantially uniformly and progressively increases from:
a. about 0 to 50 percent as the filter media particle mesh size varies from the minimum particle mesh size to the median particle mesh size, and
b. about 0 to 50 weight percent as the filter media particle mesh size varies from the maximum particle mesh size to the median particle mesh size; and
B. periodically regenerating the filter media by:
passing an oil stripping composition through said filter media in the same direction of flow as that of the fluid system to remove solids-free oil from said filter media, and
thereafter backwashing said filter media in a direction countercurrent to the flow of said fluid system at a rate from about 10 to about 35 gallons per minute per square foot of filter media surface area to remove oil-free particulate solids from said filter media.

2. A method according to claim 1 wherein the range between the minimum and maximum particle mesh sizes of the filter media is at least about 30 mesh.

3. A method according to claim 1 wherein the filter media is garnet.

4. A method according to claim 1 wherein the filter media is aluminum oxide.

5. A method according to claim 1 wherein the filter media is ground slag.

6. A method according to claim 1 wherein the filter media is volcanic tuff.

7. A method according to claim 1 wherein the oil stripping composition is initially a mixture of steam and low viscosity refined oil and thereafter steam alone.

8. A method according to claim 1 wherein the fluid system contains, additionally, acid insolubilizing, water soluble, organic material and, prior to filtration, a nontoxic acid is added to said fluid system in an amount to adjust the pH thereof below about 4.8 to convert said organic material to a water insoluble, adsorbable oil.

9. A method according to claim 1 wherein the median particle mesh size, by weight, varies linearly from about 14 to about 58 as the API Gravity value varies linearly from about 11 to about 70.

10. A method according to claim 1 wherein the flow rate of fluid system through the filter media is from about 15 to about 30 gallons per minute per square foot of filter media surface area.

11. A method according to claim 10 wherein the backwashing step is carried out at a flow rate from about 10 to about 20 gallons per minute per square foot of filter media surface area.

12. A method for treating a fluid system containing oil and water to produce clarified water and oil which comprises:
A. filtering said fluid system through a finely divided oil and water insoluble filter media containing from about 2 to about 8 cubic feet of filter material for each square foot of filter media surface area, at a flow rate from about 10 to about 35 gallons per minute per square foot of filter media surface area to retain oil within the filter media and pass an effluent selected from the group consisting of:
clarified water and
a mixture of oil and water which separates into defined layers of oil and clarified water, said mixture being attained when the oil content of the fluid system is in excess of about 1% by weight,
said filter media having:
i. a minimum particle mesh size within the range from about 3 to about 30 and a maximum particle mesh size within the range from about 30 to about 100 with the range between said minimum and maximum particle mesh sizes being at least about 20 mesh,
ii. a median particle mesh size, by weight, which is a function of the API Gravity value of the oil, said median particle mesh size falling within the range defined by maximum and minimum linear values which vary directly with the linear value of said API Gravity, said median mesh size maximum linear value varying from about 18 to 62 and said median mesh size minimum linear value varying from about 10 to 54 as said API Gravity value varies from about 11 to 70, and
iii. a particle size distribution pattern extending from the minimum particle mesh size to the maximum particle mesh size characterized in that the weight of the filter media substantially uniformly and progressively increases from:
a. about 0 to 50 weight percent as the filter media particle mesh size varies from the minimum particle mesh size to the median particle mesh size, and
b. about 0 to 50 weight percent as the filter media particle mesh size varies from the maximum particle mesh size to the median particle mesh size; and
B. periodically regenerating the filter media by:
passing an oil stripping composition through said filter media in the same direction of flow as that of the fluid system to remove oil from the filter media, and
thereafter backwashing said filter media in a direction countercurrent to the flow of said fluid system at a rate from about 10 to about 35 gallons per minute per square foot of filter media surface area.

* * * * *